US011298771B2

(12) United States Patent
Wang et al.

(10) Patent No.: US 11,298,771 B2
(45) Date of Patent: Apr. 12, 2022

(54) DSC-BASED ALL-DIGITAL SIC INVERSION TYPE MULTI-FUNCTION ARGON ARC WELDING POWER SUPPLY

(71) Applicant: South China University of Technology, Guangzhou (CN)

(72) Inventors: Zhenmin Wang, Guangzhou (CN); Wenyan Fan, Guangzhou (CN); Chun Jiang, Guangzhou (CN); Qian Wang, Guangzhou (CN)

(73) Assignee: South China University of Technology

( * ) Notice: Subject to any disclaimer, the term of this patent is extended or adjusted under 35 U.S.C. 154(b) by 926 days.

(21) Appl. No.: 16/049,956

(22) Filed: Jul. 31, 2018

(65) Prior Publication Data

US 2018/0345400 A1    Dec. 6, 2018

Related U.S. Application Data

(63) Continuation of application No. PCT/CN2017/076415, filed on Mar. 13, 2017.

(30) Foreign Application Priority Data

Aug. 15, 2016 (CN) .......................... 201610667906.8

(51) Int. Cl.
*B23K 9/10* (2006.01)
*H02M 3/335* (2006.01)
(Continued)

(52) U.S. Cl.
CPC ............ *B23K 9/1056* (2013.01); *B23K 9/067* (2013.01); *B23K 9/073* (2013.01); *B23K 9/091* (2013.01);
(Continued)

(58) Field of Classification Search
CPC ........ B23K 9/067; B23K 9/073; B23K 9/091; B23K 9/095; B23K 9/1056; B23K 9/1043; H02M 1/123; H02M 3/33515; Y02B 70/10
See application file for complete search history.

(56) References Cited

U.S. PATENT DOCUMENTS

2004/0045942 A1    3/2004 Norris et al.

FOREIGN PATENT DOCUMENTS

| CN | 1709628 A | 12/2005 |
|---|---|---|
| CN | 101502908 A | 8/2009 |

(Continued)

*Primary Examiner* — Dana Ross
*Assistant Examiner* — James F Sims, III
(74) *Attorney, Agent, or Firm* — The Webb Law Firm (57) ABSTRACT

The invention provides a DSC-based full-digital SiC inversion type multi-function argon arc welding power supply, which includes a main circuit and a DSC control circuit; the main circuit includes a common mode noise suppression module, a power frequency rectification and filter module, a SiC inversion and commutation module, power transformer, a SiC rectification and smoothing module and a non-contact arc ignition module connected in sequence and are respectively connected to external arc load; the DSC control circuit includes a DSC minimum system, a human-machine interaction module, a fault diagnosis and protection module, a SiC high-frequency drive module connected to SiC inversion and commutation module, and an electrical load signal detection module connected to the arc load. The argon arc welding power supply has a simple structure, high control accuracy, fast response, small size, high efficiency, low energy consumption and excellent process adaptability, which can improve the quality of welding process.

10 Claims, 5 Drawing Sheets

(51) Int. Cl.
*B23K 9/067* (2006.01)
*B23K 9/073* (2006.01)
*B23K 9/095* (2006.01)
*B23K 9/09* (2006.01)
*H02M 1/12* (2006.01)

(52) U.S. Cl.
CPC ......... *B23K 9/095* (2013.01); *H02M 3/33515* (2013.01); *H02M 1/123* (2021.05)

(56) References Cited

FOREIGN PATENT DOCUMENTS

| | | |
|---|---|---|
| CN | 103658933 A | 3/2014 |
| CN | 106392262 A | 2/2017 |
| CN | 205967754 U | 2/2017 |

DSC-BASED ALL-DIGITAL SIC INVERSION TYPE MULTI-FUNCTION ARGON ARC WELDING POWER SUPPLY

CROSS-REFERENCE TO RELATED APPLICATIONS

This application is a United States continuation of International Application No. PCT/CN2017/076415 filed Mar. 13, 2017, and claims priority to Chinese Patent Application No. 201610667906.8 filed Aug. 15, 2016, the disclosures of which are hereby incorporated in their entirety by reference.

BACKGROUND OF THE INVENTION

Field of the Invention

The present invention relates to the field of high-frequency arc welding inverter, more specifically, to a DSC-based all-digital SiC inversion type multi-function argon arc welding power supply.

Description of Related Art

Argon arc welding has been widely used in the welding production of stainless steel, Titanium alloys, Aluminum-Magnesium alloys and other materials. At present, argon arc welding power supply generally adopts IGBT or MOSFET high-frequency inverter, which has developed into a mature technology and can meet the welding requirements of most metal materials. However, with the development of science and technology, in the equipment manufacturing industries of marine engineering, nuclear power, aerospace, automobile, wind power, thermal power, shipbuilding, rail transportation, petrochemicals, etc., the equipment is larger, more complicated, and more diverse in materials. A variety of higher performance stainless steel, Aluminum and other black non-ferrous metals and their alloys are emerging, which demand for higher performance multi-function argon arc welding power supply equipment. However, limited by the switching speed and switching losses of power devices, the inverter frequency of the existing argon arc welding power supply is not high enough, which makes it difficult to further increase the dynamic response speed; at the same time, the widely used analog control or simple microprocessor-based digital control is difficult to achieve fine control of the argon arc welding process based on the welding arc design, affecting the further improvement of the welding quality.

SUMMARY OF THE INVENTION

The purpose of the present invention is to overcome the disadvantages and deficiencies in the prior art and provide a DSC-based all-digital SiC inversion type multi-function argon arc welding power supply with simple structure, high control accuracy, fast response, compact size, high efficiency, low energy consumption and excellent process adaptability, which improves the quality of welding process.

In order to achieve the above object, the present invention is implemented by the following technical solution:

A DSC-based all-digital SiC inversion type multi-function argon arc welding power supply, comprising a main circuit and a DSC control circuit;

the main circuit comprising a common mode noise suppression module, an power frequency rectification and filtering module, an SiC inversion and commutation module, a power transformer, a SiC rectification and smoothing module and a non-contact arc ignition module that are connected in sequence, wherein the common mode noise suppression module is connected to the external AC input power, while the SiC rectification and smoothing module and the non-contact arc ignition module are connected to external arc load respectively;

the DSC control circuit comprising a DSC minimum system, and a human-machine interaction module, a fault diagnosis and protection module, a SiC high-frequency drive module and an electrical load signal detection module which are respectively connected to the DSC minimum system; wherein the fault diagnosis and protection module also is connected separately to the AC input power supply and the SiC inversion and commutation module, the SiC high-frequency drive module is connected to the SiC inversion and commutation module, the electrical load signal detection module is connected to the arc load, and the non-contact arc ignition module is connected to the DSC minimum system.

The invention is an inversion type DC, pulsed argon arc welding power supply; the AC input power supply can be either a three-phase AC input power supply or a single-phase AC input power supply, depending on the actual output power. The required digital PWM signal is directly generated by the DSC minimum system. After being isolated, amplified and reshaped by the SiC high-frequency drive module, the PWM signal directly drives the SiC inversion and commutation module so that the SiC power tube rapidly turns on and turns off according to a preset timing and high-frequency AC-DC conversion can be achieved; the load current and voltage at the output end of the argon arc welding power supply are detected. They are input to the DSC minimum system after signal conditioning, compared with the preset value of the human-machine interaction module and change the turn-on and turn-off time of the SiC power tube to adjust the duty ratio, obtain output with desired waveform and achieve closed-loop control.

The argon arc welding power supply of the present invention adopts a new generation of power device based on SiC, which greatly increases the inverter's switching frequency so that the volume and weight of the power transformer are greatly reduced; at the same time, the switching loss is very low due to the short switching time of the SiC power device, thus magnetic core material with very low iron loss can be used to achieve ultra-high-frequency switching, which can further reduce the size and weight of power transformers and other magnetic devices and realize high power conversion efficiency. Due to the increase of the operating frequency, the filter inductance in the main circuit can be very small, so that the time constant of the argon arc welding power supply is also greatly reduced, and it is easier to obtain excellent dynamic characteristics; in addition, the high-frequency fast rectification circuit also adopts SiC fast power diode without reverse recovery effect generally, which greatly lowers the peak voltage produced by the argon arc welding power supply and improves the security. The thermal resistance of the SiC power device far exceeds that of the existing MOSFET and IGBT power device, which further improves the reliability of the argon arc welding power supply. On the other hand, as the inverter frequency increases and the loop time becomes smaller, a high speed and precise DSC minimum system can realize digital, high speed and precise control of the output current and voltage, and the output characteristics can be arbitrarily adjusted and switched, making it easy to realize optimization of welding process based on welding arc design.

Preferably, the SiC inversion and commutation module comprises a capacitor C4, a capacitor C5, a capacitor C6, a capacitor C7, a SiC power switch tube Q1, a SiC power switch tube Q2, a resistor R6, a resistor R7, a diode D4 and a diode D5.

The capacitor C4 and the capacitor C5 are connected in series, and the SiC power switch tube Q1 and the SiC power switch tube Q2 are also connected in series, then they are connected in parallel to the power frequency rectification and filter module; after the capacitor C6 and the resistor R6 are connected in series, they are connected in parallel to the SiC power switch tube Q1 which is further connected in parallel with the diode D4; after the capacitor C7 and the resistor R7 are connected in series, they are connected in parallel to the SiC power switch tube Q2 which is further connected in parallel with the diode D5; the connection point of the capacitor C4 and the capacitor C5 is further connected to the primary first input of the transformer; the connection point of the SiC power switch tube Q1 and the SiC power switch tube Q2 is connected to the primary second input of the power transformer; the SiC power switch tube Q1 and the SiC power switch tube Q2 are respectively connected to the SiC high-frequency drive module.

Preferably, the SiC rectification and smoothing module comprises a diode D6A, a diode D6B, a resistor R5, a resistor R9, a resistor R11, a capacitor C9, a capacitor C10, a capacitor C11, a capacitor C12, a capacitor C17, a varistor YM1, and a varistor YM2 and an inductor L2;

the secondary first output of the power transformer is connected to the secondary output of the power transformer through the diode D6A, the resistor R9, and the inductor L2 in sequence; after the resistor R5 and the capacitor C9 are connected in series, they are further connected to the diode D6A in parallel; the diode D6A is connected to the varistor YM1 in parallel; after the capacitor C11 and the capacitor C12 are connected in series, they are connected to the resistor R9 in parallel; the resistor R9 is connected in parallel with the capacitor C10; the connection point of the capacitor C11 and the capacitor C12 is grounded;

The connection point of diode D6A and resistor R9 is further connected to the secondary output of the power transformer through diode D6B; after capacitor C17 is connected in series with resistor R11, they are further connected in parallel with diode D6B; diode D6B is connected in parallel with varistor YM2; both ends of resistor R9 are connected to the arc load separately.

In the main circuit, the AC input power is first connected to the common mode noise suppression module followed by the power frequency rectification and filter module. After the AC input power is switched to a smooth DC power, it is input to the half-bridge SiC inversion and commutation module and turned into a high-voltage square-wave pulse through the alternate turn-on and turn-off of the SiC power switch tube Q1 and the SiC power switch tube Q2; it is then electrically isolated, voltage-transformed, and power-transmitted by the power transformer; finally it is converted to a low voltage smooth DC output by the SiC rectification and smoothing module. Among them, diode D6A and diode D6B are SiC fast/ultra-fast rectification power diodes; capacitor C10, capacitor C11, capacitor C12, and resistor R9 not only function as dead loads, but also serve as bypass for the non-contact high-frequency arc ignition signals, which improves the reliability and stability of the system.

Preferably, the SiC high-frequency drive module comprises a power supply circuit, a push-pull output circuit, a magnetic isolation circuit and a signal shaping circuit.

Preferably, the power supply circuit consists of an LM2596s voltage switching regulator and its peripheral circuit.

Preferably, the push-pull output circuit comprises an IXDN609PI switching amplifier U1 and its peripheral circuit, and an IXDN609PI switching amplifier U2 and its peripheral circuit; the input ends of the switching amplifier U1 and the switching amplifier U2 are separately connected to SiC inversion and commutation module, while their output ends are respectively connected to the magnetic isolation circuit.

Preferably, the magnetic isolation circuit comprises a pulse transformer T101; the signal shaping circuit comprises signal shaping unit 1 and a signal shaping unit 2 with identical structure; the signal shaping unit 1 and the signal shaping unit 2 are respectively connected to the two secondary coils of pulse transformer T101 in opposite direction.

Preferably, the signal shaping unit includes a diode D113, a diode D117, a Zener diode D122, a Zener diode D125, a Zener diode D126, a dual diode group DQ101, a resistor R105, a resistor R109, a resistor R117, a resistor R121 and a switch tube Q101;

One end of the secondary first coil of the pulse transformer T101 is in turn connected through the diode D117, the Zener diode D122, the Zener diode D126, the Zener diode D125 and the diode D113; the diode D113 is connected to another end of the secondary first coil of the magnetic isolation circuit; one end of the secondary first coil of the magnetic isolation circuit is connected to the diode D113 through the resistor 109; the Zener diode D122 is connected to the diode D113 through resistor R113 and the dual diode group DQ101; the Zener diode D122 is also connected to the diode D113 through the resistor R121 and the resistor R117; the connection point of the diode D117 and the Zener diode D122 is connected to the diode D113 through the switch tube Q101; the connection point of the resistor R109 and the diode D117 is connected to the switch tube Q101; the resistor 105 is connected in parallel with the diode D113; and the capacitor C115 is connected in parallel with the Zener diode D122.

Preferably, the electrical load signal detection module comprises a Hall current and voltage sensor, an integrated differential amplifier circuit consisting of an AD629 precise differentiation amplifier and its peripheral circuits, a second-order active low-pass filter circuit consisting of a chip whose model is OP177 and its peripheral circuits and an absolute value circuit formed by a chip whose model is LF353 and its peripheral circuits; the Hall current and voltage sensor, integrated differential amplifier circuit, second-order active low-pass filter circuit and absolute value circuit are connected in order.

Preferably, the non-contact arc ignition module comprises a step-up transformer T1, a discharger FD, a high voltage charging capacitor C, an output coupling transformer T2, a SiC power switch tube Q10 and a switch K; the primary coil of the step-up transformer T1, the SiC power switch tube Q10 and the switch K connected in series are further connected to the power supply module of the non-contact arc ignition module; the secondary side of the step-up transformer T1 is connected to the primary side of the output coupling transformer T2 through the discharger FD; the secondary side of the output coupling transformer T2 is connected to the arc load; the capacitor C is connected in parallel to the secondary side of the step-up transformer T1; the minimum DSC system is connected to the SiC power switch tube Q10 and the switch K, respectively.

Compared with the prior art, the present invention has the following advantages and beneficial effects:

1. Compared with the traditional argon arc welding power supply, the power switching devices of the argon arc welding power source of the present invention all adopt SiC power tubes of new generation power electronic device, whose switching frequency is higher, volume is reduced by more than ⅓, integrated manufacturing cost is lowered by more than 25%, energy consumption is decreased by around 10%, and performance is greatly improved;

2. The argon arc welding power supply of the present invention adopts a DSC-based high-speed, high-precision and full-digital control technology, which has higher control accuracy and faster response speed, realizes closed-loop control, is easier to realize fine design and control of welding arc, and improves the quality of welding process;

3. The SiC power device used in the argon arc welding power supply of the present invention has better thermal resistance, almost no conductivity modulation effect and almost no reverse recovery time. Therefore, the switching stress of the device is greatly improved, which achieves higher reliability of the whole structure.

DESCRIPTION OF THE INVENTION

The present invention will be further described in detail with reference to the accompanying drawings and specific embodiments.

Embodiment

The structure of a DSC-based all-digital SiC inversion type multi-function argon arc welding power supply of the present embodiment is shown in FIG. 1 to FIG. 6; it comprises a main circuit and a DSC control circuit.

Figure 1:
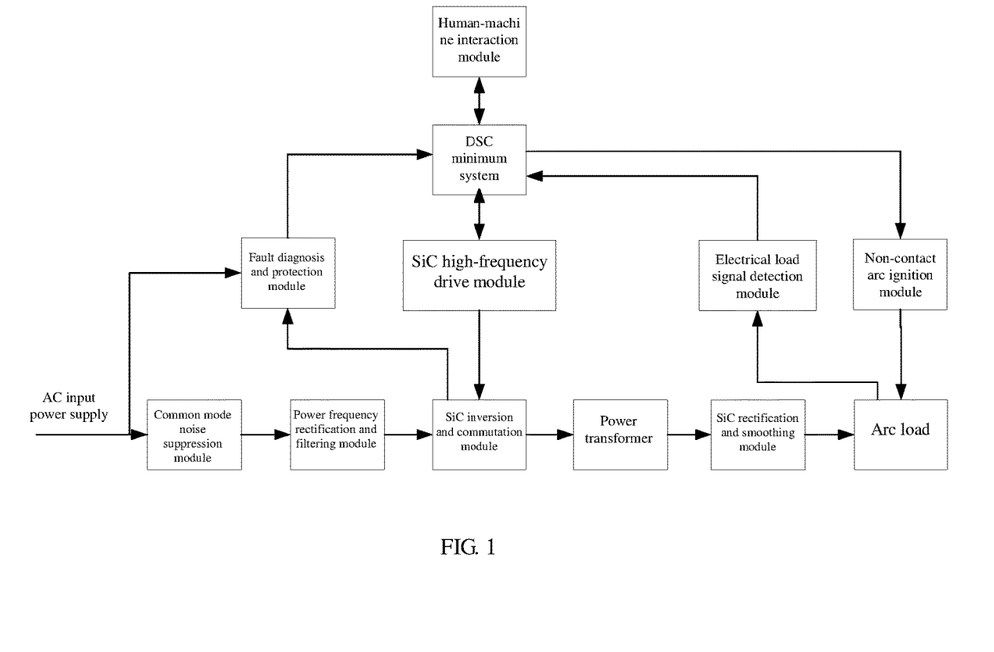
FIG. 1 is a system block diagram of an argon arc welding power supply according to the present invention.

The main circuit comprises a common mode noise suppression module, an power frequency rectification and filter module, an SiC inversion and commutation module, a power transformer, a SiC rectification and smoothing module and a non-contact arc ignition module that are connected in sequence; wherein the common mode noise suppression module is connected to the external input power supply; SiC rectification and smoothing module and non-contact arc ignition module are connected to the external arc load, respectively.

The DSC control circuit includes a DSC minimum system, and a human-machine interaction module, a fault diagnosis and protection module, a SiC high-frequency drive module and an electrical load signal detection module respectively connected to the DSC minimum system; wherein, the fault diagnosis and protection module is also separately connected to the AC input power supply and the SiC inversion and commutation module; the SiC high-frequency drive module is also connected to the SiC inversion and commutation module; the electrical load signal detection module is also connected to the arc load; and the non-contact arc ignition module is connected to the DSC minimum system.

Figure 2:
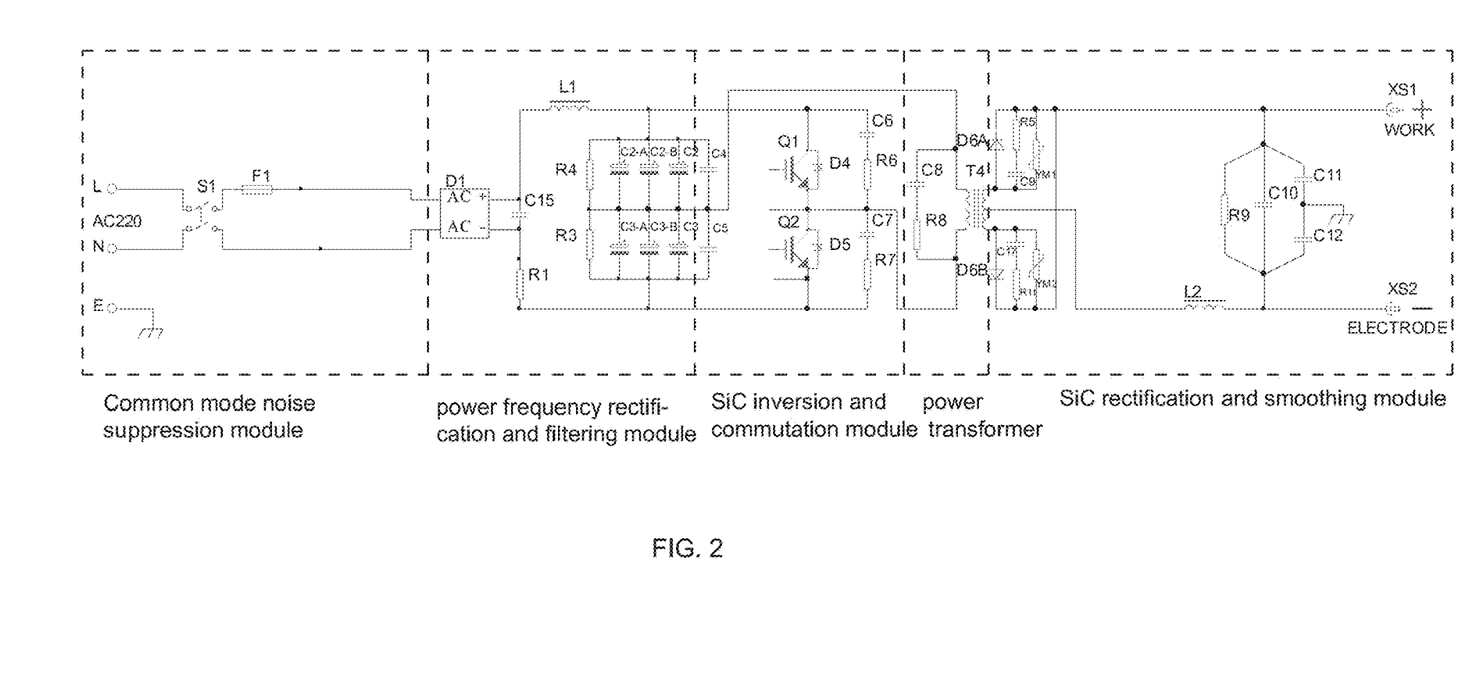
FIG. 2 is a circuit diagram of the main circuit in an argon arc welding power supply according to the present invention.
Figure 3:
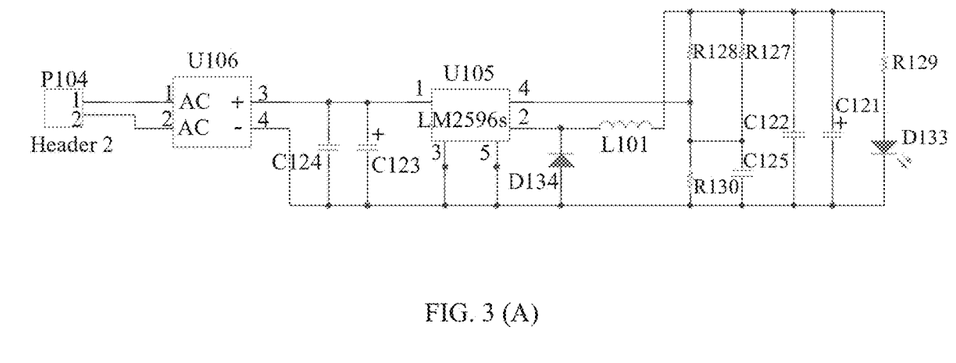
FIGS. 3(A) to 3(C) are circuit diagrams of the SiC high-frequency drive module in the argon arc welding power supply.

The SiC inversion and commutation module comprises a capacitor C4, a capacitor C5, a capacitor C6, a capacitor C7, a SiC power switch tube Q1, a SiC power switch tube Q2, a resistor R6, a resistor R7, a diode D4 and a diode D5.

The capacitor C4 and the capacitor C5 are connected in series, and the SiC power switch tube Q1 and the SiC power switch tube Q2 are also connected in series, then they are connected in parallel to the power frequency rectification and filter module; after the capacitor C6 and the resistor R6 are connected in series, they are connected in parallel to the SiC power switch tube Q1 which is further connected in parallel with the diode D4; after the capacitor C7 and the resistor R7 are connected in series, they are connected in parallel to the SiC power switch tube Q2 which is further connected in parallel with the diode D5; the connection point of the capacitor C4 and the capacitor C5 is further connected to the primary first input of the transformer; the connection point of the SiC power switch tube Q1 and the SiC power switch tube Q2 is connected to the primary second input of the power transformer; the SiC power switch tube Q1 and the SiC power switch tube Q2 are respectively connected to the SiC high-frequency drive module.

The SiC rectification and smoothing module comprises a diode D6A, a diode D6B, a resistor R5, a resistor R9, a resistor R11, a capacitor C9, a capacitor C10, a capacitor C11, a capacitor C12, a capacitor C17, a varistor YM1, and a varistor YM2 and an inductor L2.

The secondary first output of the power transformer is connected to the secondary output of the power transformer through the diode D6A, the resistor R9, and the inductor L2 in sequence; after the resistor R5 and the capacitor C9 are connected in series, they are further connected to the diode D6A in parallel; the diode D6A is connected to the varistor YM1 in parallel; after the capacitor C11 and the capacitor C12 are connected in series, they are connected to the resistor R9 in parallel; the resistor R9 is connected in parallel with the capacitor C10; the connection point of the capacitor C11 and the capacitor C12 is grounded.

The connection point of diode D6A and resistor R9 is further connected to the secondary output of the power transformer through diode D6B; after capacitor C17 is connected in series with resistor R11, they are further connected in parallel with diode D6B; diode D6B is connected in parallel with varistor YM2; both ends of resistor R9 are connected to the arc load separately.

The invention is an inverter DC, pulsed argon arc welding power supply; the AC input power supply can be either a three-phase AC input power supply or a single-phase AC input power supply, depending on the actual output power. The main circuit can be half-bridge topology or full-bridge inverse topology. The human-machine interaction module has a UART, CAN or ETHERNET communication interface, and can be either a digital keypad mode digital interface or an industrial touch screen interface. The required digital PWM signal is directly generated by the DSC minimum system. After being isolated, amplified and reshaped by the SiC high-frequency drive module, the digital PWM signal directly drives the SiC inversion and commutation module so that the SiC power tube rapidly turns on and turns off according to a preset timing and high-frequency AC-DC conversion can be achieved; the load current and voltage at the output end of the argon arc welding power supply are detected. They are input to the DSC minimum system after signal conditioning, compared with the preset value of the human-machine interaction module and change the turn-on and turn-off time of the SiC power tube to adjust the duty ratio, obtain output with desired waveform and achieve closed-loop control.

The argon arc welding power supply of the present invention adopts a new generation of power device based on SiC, which greatly increases the inverter's switching frequency so that the volume and weight of the power transformer are greatly reduced; at the same time, the switching loss is very low due to the short switching time of the SiC power device, thus magnetic core material with very low iron loss can be used to achieve ultra-high-frequency switching, which can further reduce the size and weight of power transformers and other magnetic devices and realize high power conversion efficiency. Due to the increase of the operating frequency, the filter inductance in the main circuit can be very small, so that the time constant of the argon arc welding power supply is also greatly reduced, and it is easier to obtain excellent dynamic characteristics; in addition, the high-frequency fast rectification circuit also adopts SiC fast power diode without reverse recovery effect generally, which greatly lowers the peak voltage produced by the argon arc welding power supply and improves the security. The thermal resistance of the SiC power device far exceeds the existing MOSFET and IGBT power device, which further improves the reliability of the argon arc welding power supply. On the other hand, as the inverter frequency increases and the loop time becomes shorter, a high speed and precise DSC minimum system can realize digital, high speed and precise control of the output current and voltage, and the output characteristics can be arbitrarily adjusted and switched, making it easy to realize optimization of welding process based on welding arc design.

In the main circuit, the AC input power is first connected to the common mode noise suppression module followed by the power frequency rectification and filter module. After the current is switched to a smooth DC power, it is input to the half-bridge SiC inversion and commutation module and turned into a high voltage square-wave pulse through the alternate turn-on and turn-off of the SiC power switch tube Q1 and the SiC power switch tube Q2; it is then electrically isolated, voltage-transformed, and power-transmitted by the power transformer; finally it is converted to a low voltage smooth DC output by the SiC rectification and smoothing module. Among them, diode D6A and diode D6B are SiC fast/ultra-fast rectification power diodes; capacitor C10, capacitor C11, capacitor C12, and resistor R9 not only function as dead loads, but also serve as a bypass for the non-contact high-frequency arc ignition signals, which improves the reliability and stability of the system.

Figure 6:
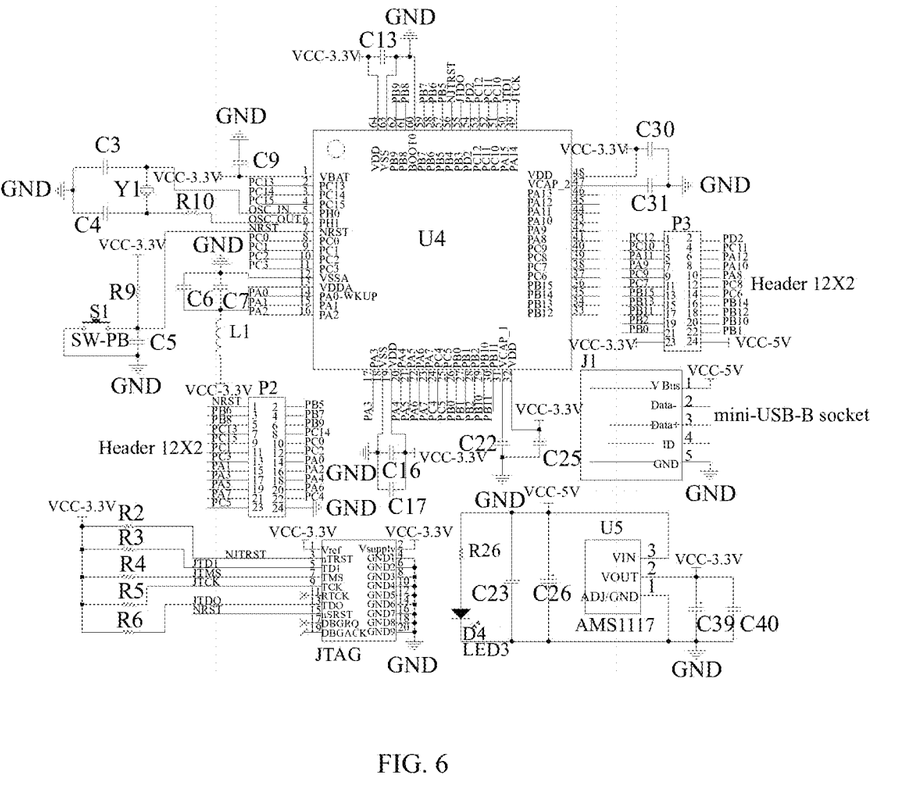
FIG. 6 is a circuit diagram of the DCS minimum system in an argon arc welding power supply of the present invention.

The DSC minimum system comprises a DSC microprocessor, a precise 3.3V power supply module, an external clock oscillation module, a reset module, a JTAG debug interface and other auxiliary peripheral circuits. DSC microprocessor embeds a FREERTOS system to complete the real-time scheduling of multiple control tasks in the argon arc welding power supply; the input of the electrical load signal detection module is connected to the ADC interface of the DSC microprocessor; the output of the fault diagnosis and protection module is connected to the interrupt interface of the DSC microprocessor.

The SiC high-frequency drive module comprises a power supply circuit, a push-pull output circuit, a magnetic isolation circuit and a signal shaping circuit. The power supply circuit consists of an LM2596s voltage switching regulator and its peripheral circuits. The input voltage of the power supply circuit can be up to 40V, while adjustable voltage of 1.2V to 37V and output current of 3A may be output. Moreover, the power supply circuit has overheat protection and current limiting protection function. In this embodiment, the set output voltage is 24V DC.

The push-pull output circuit comprises an IXDN609PI switching amplifier U1 and its peripheral circuit, and an IXDN609PI switching amplifier U2 and its peripheral circuit; the input ends of the switching amplifier U1 and the switching amplifier U2 are separately connected to SiC inversion and commutation module, while their output ends are respectively connected to the magnetic isolation circuit. After the digital PWM signal A/B generated by the DSC controller is processed by the isolation, it drives the push-pull output circuit consisting of IXDN609PI to output two push-pull pulse drive signals OUT-A1 and OUT-B1.

The magnetic isolation circuit comprises a pulse transformer T101; the signal shaping circuit comprises signal shaping unit 1 and a signal shaping unit 2 with identical structure; the signal shaping unit 1 and the signal shaping unit 2 are respectively connected to the two secondary coils of pulse transformer T101 in opposite direction.

The signal shaping unit includes diode D113, diode D117, Zener diode D122, Zener diode D125, Zener diode D126, dual diode group DQ101, resistor R105, resistor R109, resistor R117, resistor R121 and switch tube Q101.

One end of the secondary first coil of the pulse transformer T101 is in turn connected through diode D117, Zener diode D122, Zener diode D126, Zener diode D125 and diode D113; the diode D113 is connected to another end of the secondary first coil of the magnetic isolation circuit; one end of the secondary first coil of the magnetic isolation circuit is connected to the diode D113 through the resistor 109; the Zener diode D122 is connected to the diode D113 through resistor R113 and the dual diode group DQ101; the Zener diode D122 is also connected to the diode D113 through the resistor R121 and the resistor R117; the connection point of the diode D117 and the Zener diode D122 is connected to the diode D113 through the switch tube Q101; the connection point of the resistor R109 and the diode D117 is connected to the switch tube Q101; the resistor 105 is connected in parallel with the diode D113; and the capacitor C115 is connected in parallel with the Zener diode D122. The signal shaping circuit generates a +20V, −5.1V SiC power switch driving voltage signal to increase the turn-on and turn-off speed of the power switch.

Figure 4:
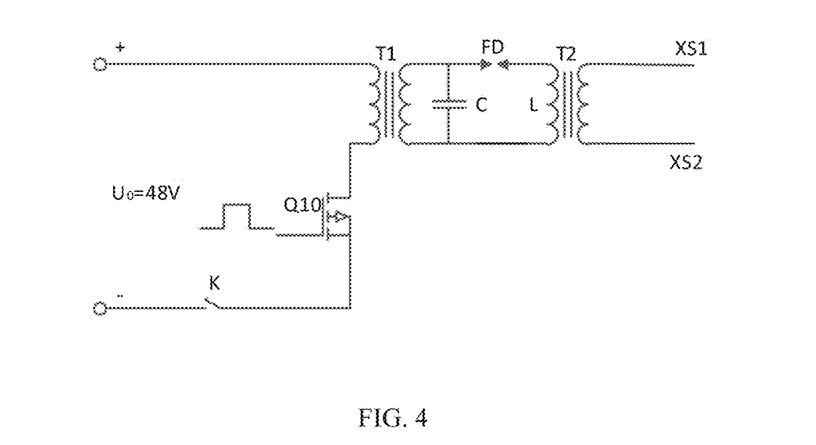
FIG. 4 is a circuit diagram of the non-contact arc ignition module in an argon arc welding power supply according to the present invention.

The non-contact arc ignition module comprises a step-up transformer T1, a discharger FD, a high voltage charging capacitor C, an output coupling transformer T2, a SiC power switch tube Q10 and a switch K; the primary coil of the step-up transformer T1, the SiC power switch tube Q10 and the switch K connected in series are further connected to the power supply module of the non-contact arc ignition module; the secondary side of the step-up transformer T1 is connected to the primary side of the output coupling transformer T2 through the discharger FD; the secondary side of the output coupling transformer T2 is connected to the arc load; the capacitor C is connected in parallel to the secondary side of the step-up transformer T1; the minimum DSC system is connected to the SiC power switch tube Q10 and the switch K, respectively.

The GPIO output level of DSC microprocessor controls the opening and closing of SiC power switch tube Q10 and switch K respectively. When the welding torch switch is closed, one GPIO port of the DSC microprocessor outputs high level to close the switch K, and another GPIO port of DSC microprocessor outputs drive signal of SiC power switch tube Q10 to promote fast switching of SiC power switch tube Q10; the input DC voltage U0 charges capacitor C after being raised by the step-up transformer T1; when the voltage of capacitor C reaches the breakdown voltage of discharger FD, the air gap of discharger FD is punctured and discharged; equivalent resistor R of discharger FD, capacitor C, primary inductor L of the coupling transformer T2 form RLC oscillation and produce high-frequency high voltage signal, which is loaded between the tungsten electrode and workpiece through the secondary side of the coupling transformer T2 to puncture through the gap and ignite the arc. The DSC microprocessor judges whether the arc initiation successes or not according to the output current and voltage; if arc initiation successes, the DSC microprocessor will shut down the output of the GPIO, open switch K, so that the non-contact arc ignition module stops working. The structure of the non-contact arc ignition module is very simple, meantime with strong arc initiating ability, high success rate, and small electromagnetic interference.

Figure 5:
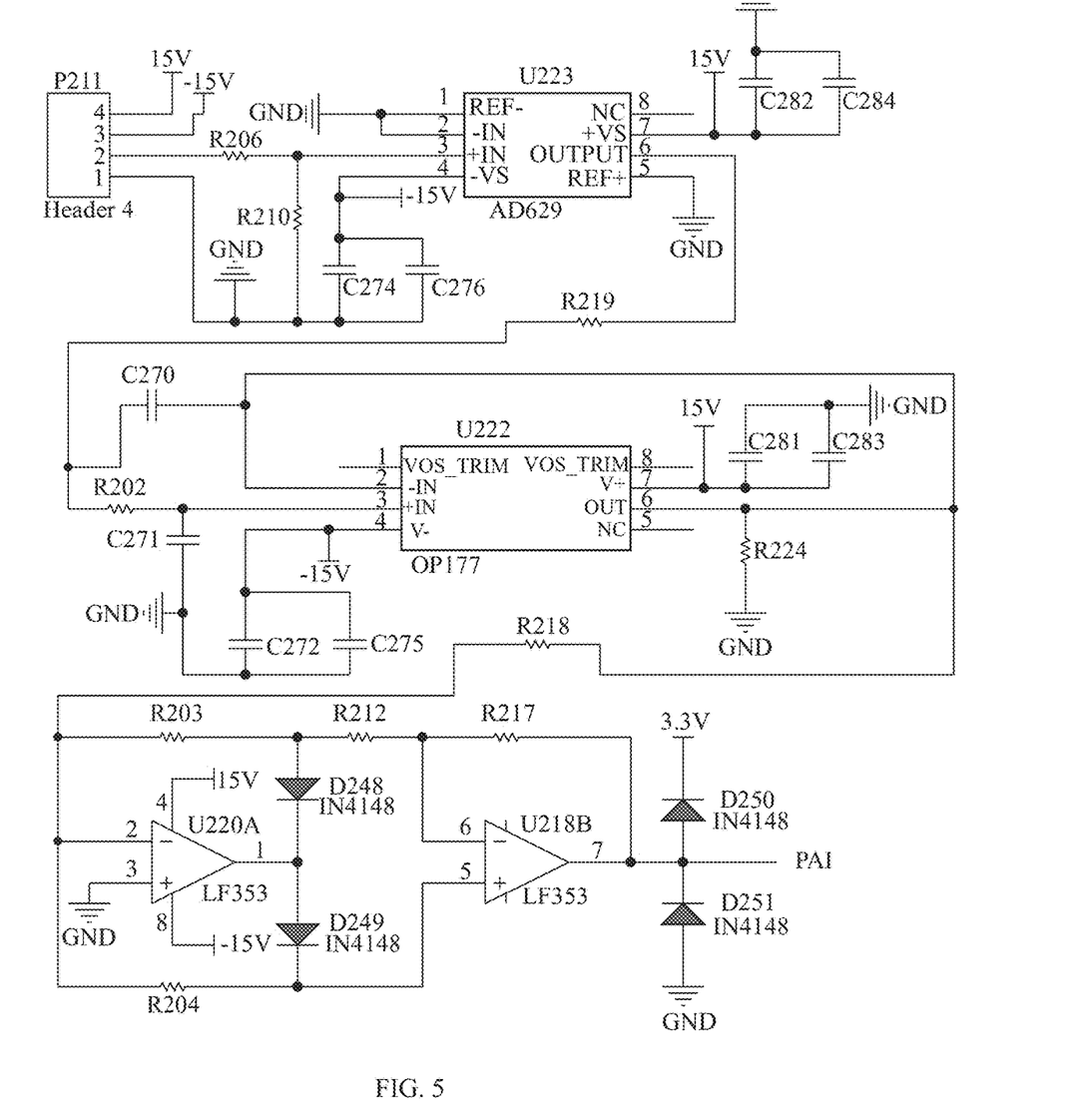
FIG. 5 is a circuit diagram of the electrical load signal detection module in an argon arc welding power supply according to the present invention.

The load signal detection module consists of a Hall current and voltage sensor, an integrated differential amplifier consisting of a AD629 precise differentiation amplifier and its peripheral circuit, a second-order active low-pass filter circuit consisting of a chip whose model is OP177 and its peripheral circuit, and an absolute value circuit consisting of a chip whose model is LF353 and its peripheral circuit. Hall current and voltage sensor, integrated differential amplifier, second-order active low-pass filter circuit and absolute value circuit are connected sequentially.

When the load current is sampled, the Hall current and voltage sensor uses a HAS600-S sensor. When the load voltage is sampled, the Hall current and voltage sensor uses a LV25-P sensor. After the current and voltage signal is sampled by Hall current and voltage sensor and converted, it is suppressed with common mode by the integrated differential amplifier circuit, filtered by the second-order active low-pass filter, adjusted through the absolute value circuit and finally input to the ADC module of the DSC microprocessor to transform to identifiable digital signal for the DSC microprocessor. In order to prevent the input of excessive voltage or negative voltage to the DSC microprocessor, diode D250 and diode D251 is added to clamp before the input pin, and the input feedback signal is kept between 0-3.3V so that the chip pin of the DSC microprocessor is protected.

The AC input power supply of the argon arc welding power supply transforms the AC with power frequency to smooth DC after passing through the common mode noise suppression mode and entering the power frequency rectification and filter module. Then the current pass through the SiC inversion and commutation module. The DSC minimum system compares the preset value sent from the human-machine interaction module to the actual current and voltage value input by the load signal detection module and generates the corresponding digital PWM signals according to the embedded algorithm. After isolation, amplification and reformation by the SiC high-frequency drive module, the SiC power switch tube of the SiC inverter module is driven to open and close fast according to the preset duty ratio and the frequency so that high-frequency high voltage AC square wave pulse up to 400 kHz can be obtained; and then it is converted by the power transformer into low voltage high-frequency square wave pulse followed by being transformed into DC for the argon arc welding by the SiC rectification and the smooth module, so as to complete a full closed-loop control process.

The DSC microprocessor can determine whether and when to activate the non-contact arc ignition module. The fault diagnosis and protection module detects the real time temperature of the voltage and power device radiator of the AC input power supply to determine whether there is overvoltage, undervoltage or overheating. Once overvoltage/undervoltage/overheating/overcurrent occurs, the output of the fault diagnosis and protection module will interrupt the DSC microprocessor and call the fault protection task. The DSC microprocessor compares the average current value of the load signal detection module to the preset current value to judge whether the flow is too strong, and once overcurrent occurs, the fault protection will be called, the output of the digital PWM will be blocked, the SiC power switch tube will be closed to ensure the safety of the main circuit.

The above embodiments are better implementations of the invention, but the methods of implementation of the invention are not limited by the above mentioned embodiments, and any other changes, modification, substitution, combination and simplification which are not deviated from the spirit essence and principle of the invention should be equivalent to the present invention, all of which are included in the scope of protection of the invention.

What is claimed is:

1. A DSC-based all-digital SiC inversion type multifunction argon arc welding power supply, comprising a main circuit and a DSC control circuit;

the main circuit comprising a common mode noise suppression module, a power frequency rectification and filtering module, a SiC inversion and commutation module, a power transformer, a SiC rectification and smoothing module and a non-contact arc ignition module that are connected in sequence, wherein the common mode noise suppression module is connected to an external AC input power, while the SiC rectification and smoothing module and the non-contact arc ignition module are connected to external arc load respectively;

the DSC control circuit comprising a DSC minimum system, and a human-machine interaction module, a SiC high-frequency drive module and an electrical load signal detection module which are respectively connected to the DSC minimum system; wherein the DSC minimum system comprises a DSC microprocessor, a 3.3V power supply module, an external clock oscillation module, a reset module, a JTAG debug interface and auxiliary peripheral circuits, the SiC high-frequency drive module is connected to the SiC inversion and commutation module, the electrical load signal detection module is connected to the arc load, and the non-contact arc ignition module is connected to the DSC minimum system.

2. The DSC-based all-digital SiC inversion type multifunction argon arc welding power supply as claimed in claim 1, wherein the SiC inversion and commutation module comprises a capacitor (C4), a capacitor (C5), a capacitor (C6), a capacitor (C7), a SiC power switch tube (Q1), a SiC power switch tube (Q2), a resistor (R6), a resistor (R7), a diode (D4) and a diode (D5);

the capacitor (C4) and the capacitor (C5) are connected in series to form a first circuit, and the SiC power switch tube (Q1) and the SiC power switch tube (Q2) are connected in series to form a second circuit, the first circuit and the second circuit are connected in parallel to the power frequency rectification and filter module;

the capacitor (C6) and the resistor (R6) are connected in series to form a third circuit, the third circuit is connected in parallel to the SiC power switch tube (Q1) which is further connected in parallel with the diode (D4); the capacitor (C7) and the resistor (R7) are connected in series to form a fourth circuit, the fourth circuit is connected in parallel to the SiC power switch tube (Q2) which is further connected in parallel with the diode (D5); a connection point of the capacitor (C4) and the capacitor (C5) is further connected to a primary first input of the transformer; a connection point of the SiC power switch tube (Q1) and the SiC power switch tube (Q2) is connected to a primary second input of the power transformer; the SiC power switch tube (Q1) and the SiC power switch tube (Q2) are respectively connected to the SiC high-frequency drive module.

3. The DSC-based all-digital SiC inversion type multifunction argon arc welding power supply as claimed in claim 1, wherein the SiC rectification and smoothing module comprises a diode (D6A), a diode (D6B), a resistor (R5), a resistor (R9), a resistor (R11), a capacitor (C9), a capacitor (C10), a capacitor (C11), a capacitor (C12), a capacitor (C17), a varistor (YM1), a varistor (YM2) and an inductor (L2);

a secondary first output of the power transformer is connected to a secondary second output of the power transformer through the diode (D6A), the resistor (R9), and the inductor (L2) in sequence; the resistor (R5) and the capacitor (C9) are connected in series to form a fifth circuit, the fifth circuit is arc connected to the diode (D6A) in parallel; the diode (D6A) is connected to the varistor (YM1) in parallel; the capacitor (C11) and the capacitor (C12) are connected in series to form a sixth circuit, the sixth circuit is connected to the resistor (R9) in parallel; the resistor (R9) is connected in parallel with the capacitor (C10); a connection point of the capacitor (C11) and the capacitor (C12) is grounded;

a connection point of diode (D6A) and resistor (R9) is further connected to a secondary third output of the power transformer through diode (D6B); capacitor (C17) is connected in series with resistor (R11) to form a seventh circuit, the seventh circuit is connected in parallel with diode (D6B); diode (D6B) is connected in parallel with varistor (YM2); both ends of resistor (R9) are connected to the arc load separately.

4. The DSC-based all-digital SiC inversion type multifunction argon arc welding power supply as claimed in claim 1, wherein the SiC high-frequency drive module comprises a power supply circuit, a push-pull output circuit, a magnetic isolation circuit and a signal shaping circuit.

5. The DSC-based all-digital SiC inversion type multifunction argon arc welding power supply as claimed in claim 4, wherein the power supply circuit consists of an LM2596s voltage switching regulator and a peripheral circuit of the LM2596s voltage switching regulator.

6. The DSC-based all-digital SiC inversion type multifunction argon arc welding power supply as claimed in claim 4, wherein the push-pull output circuit comprises an IXDN609PI switching amplifier (U1) and a peripheral circuit of the IXDN609PI switching amplifier (U1), and an IXDN609PI switching amplifier (U2) and a peripheral circuit of the IXDN609PI switching amplifier (U2); input ends of the switching amplifier (U1) and the switching amplifier (U2) are separately connected to SiC inversion and commutation module, while their output ends are respectively connected to the magnetic isolation circuit.

7. The DSC-based all-digital SiC inversion type multifunction argon arc welding power supply as claimed in claim 4, wherein the magnetic isolation circuit comprises a pulse transformer (T101); the signal shaping circuit comprises a signal shaping unit 1 and a signal shaping unit 2 with identical structure; the signal shaping unit 1 and the signal shaping unit 2 are respectively connected to two secondary coils of pulse transformer (T101) in opposite direction.

8. The DSC-based all-digital SiC inversion type multifunction argon arc welding power supply as claimed in claim 7, wherein the signal shaping unit includes a diode (D113), a diode (D117), a Zener diode (D122), a Zener diode (D125), a Zener diode (D126), a dual diode group (DQ101), a resistor (R105), a resistor (R109), a resistor (R117), a resistor (R121) and a switch tube (Q101);

one end of a secondary first coil of the pulse transformer (T101) is in turn connected to the diode (D113) through the diode (D117), the Zener diode (D122), the Zener diode (D126), and the Zener diode (D125); the diode (D113) is connected to the other end of the secondary first coil of the magnetic isolation circuit; one end of a secondary first coil of the magnetic isolation circuit is connected to the diode (D113) through the resistor (109); the Zener diode (D122) is connected to the diode (D113) through resistor (R113) and the dual diode group (DQ101); the Zener diode (D122) is connected to the diode (D113) through the resistor (R121) and the resistor (R117); a connection point of the diode (D117) and the Zener diode (D122) is connected to the diode (D113) through the switch tube (Q101); a connection point of the resistor (R109) and the diode (D117) is connected to the switch tube (Q101); the resistor (105) is connected in parallel with the diode (D113); and the capacitor (C115) is connected in parallel with the Zener diode (D122).

9. The DSC-based all-digital SiC inversion type multifunction argon arc welding power supply as claimed in claim 1, wherein the electrical load signal detection module comprises a Hall current and voltage sensor, an integrated differential amplifier circuit consisting of an AD629 precise differentiation amplifier and a peripheral circuit of the AD629 precise differentiation amplifier, a second-order active low-pass filter circuit consisting of an OP177 chip and a peripheral circuit of the OP177 chip and an absolute value circuit formed by an LF353 chip and a peripheral circuit of the LF353 chip; the Hall current and voltage sensor, integrated differential amplifier circuit, second-order active low-pass filter circuit and absolute value circuit are connected in order.

10. The DSC-based all-digital SiC inversion type multifunction argon arc welding power supply as claimed in claim 1, wherein the non-contact arc ignition module comprises a step-up transformer (T1), a discharger (FD), a high voltage charging capacitor (C), an output coupling transformer (T2), a SiC power switch tube (Q10) and a switch (K); a primary coil of the step-up transformer (T1), the SiC power switch tube (Q10) and the switch (K) connected in series are further connected to a power supply module of the non-contact arc ignition module; a secondary side of the step-up transformer (T1) is connected to the primary side of the output coupling transformer (T2) through the discharger (FD); a secondary side of the output coupling transformer (T2) is connected to the arc load; the capacitor (C) is connected in parallel to the secondary side of the step-up transformer (T1); the minimum DSC system is connected to the SiC power switch tube (Q10) and the switch (K), respectively.

* * * * *

UNITED STATES PATENT AND TRADEMARK OFFICE
CERTIFICATE OF CORRECTION

PATENT NO. : 11,298,771 B2  
APPLICATION NO. : 16/049956  
DATED : April 12, 2022  
INVENTOR(S) : Wang et al.

Page 1 of 1

It is certified that error appears in the above-identified patent and that said Letters Patent is hereby corrected as shown below:

On the Title Page

Item (73), Column 1, Assignee, Line 1, delete "Technology" and insert -- Technology, (CN) --

In the Claims

Column 11, Line 36, Claim 3, delete "is arc" and insert -- is --

Signed and Sealed this  
Twenty-third Day of May, 2023

Katherine Kelly Vidal  
*Director of the United States Patent and Trademark Office*